Nov. 2, 1926. 1,605,245
O. P. R. LEHMANN
PROJECTING MACHINE
Filed May 14, 1924 5 Sheets-Sheet 1

Fig. 1.

INVENTOR
OTTO P. R. LEHMANN
BY
ATTORNEYS

Nov. 2, 1926.  
O. P. R. LEHMANN  
PROJECTING MACHINE  
Filed May 14, 1924  
1,605,245  
5 Sheets-Sheet 3

INVENTOR  
*Otto P. R. Lehmann*  
BY  
ATTORNEYS

Patented Nov. 2, 1926.

1,605,245

UNITED STATES PATENT OFFICE.

OTTO P. R. LEHMANN, OF NEWARK, NEW JERSEY, ASSIGNOR TO VICTOR C. THORNE, OF NEW YORK, N. Y.

PROJECTING MACHINE.

Application filed May 14, 1924. Serial No. 713,154.

This invention relates to projection machines and has for its principal object to provide a new and improved machine of the type set forth having means to support a plurality of slides provided with photographic views or advertising matter, which slides will be automatically and successively brought before the projection machine. Another object is to so construct the slide supporting means and the means for moving the slides to and from the projection lenses that the entire supply of slides contained in the machine can be projected repeatedly and continuously without necessitating the removal or rearrangement thereof after they have been placed within the slide magazines, whereby the machine after having been placed in operation is adapted to continue in operation without requiring any special attention. These and other objects such as compactness and sturdiness of construction, and surety of operation will be apparent, to those skilled in the art to which my invention appertains, from the following more detailed description and by reference to the accompanying drawings wherein an example of my invention is illustrated without defining its limits.

In the drawings—

Figs. 8, 9, and 10 show a modified form of slide holder adapted to hold a single slide; Fig. 8 is a fragmentary front view partly in section; Fig. 9 a fragmentary end view and Fig 10 a fragmentary plan view partly broken away in section.

For the purpose of clearness the various parts of the apparatus will be described under the following headings: the framework, the projection apparatus, the slide carrying magazines, the slide changing mechanism, the reel driving mechanism and the manual reel driving device.

The framework.

The framework consists of a suitable base 10 to which is secured a gear housing 11 upon which the operating gears to be hereinafter described are mounted. Secured to the top of the gear housing 11, is a bracket 12, having a pair of laterally extending arms 13 at the upper end thereof. A pair of plates 15, which are secured one to each side of the gear housing, having their front portions 15$^a$ formed into a substantially circular form to provide a closure for the slide reels to be hereinafter described. The rear portions 15$^b$ of said plates are connected by a wall 16 to which the cover 17 is hinged as at 17$^a$, the side walls 17$^b$ of said cover and the side plates 15 forming the lamp box A in which the major portion of the projection apparatus is mounted.

The projection apparatus.

Mounted upon a bracket 18, suitably secured to the inside wall of the plate or wall 16, is an electric lamp 19 located substantially at the focal point of the parabolic reflector 20, which is also suitably secured to the cover 17. The light rays from the lamp 19 are reflected by the reflector 20 through a double convex lens 21 mounted in front of the lamp 19, the light rays being directed by said lens 21 into the collector tube 22, which is provided with suitable optical system of lenses in accordance with the well known construction of devices of this character. A short distance from its inner end the collector tube 22 is provided with a downwardly extending flange 23, which forms a means for securing the tube to the bracket 12.

An electric motor 26, suitably secured to the base 10, is mounted within the lamp box and has secured upon one end of its armature shaft 27 a fan 28 by means of which air is drawn into the apparatus through an aperture 29 provided in the rear wall or plate 16 and dispelled through the lamp house.

The slide carrying magazines.

The slide carrying magazines consist of a pair of reels BB mounted one on each side of the machine and as both of such reels are identical in construction a description of one will be sufficient. Each reel has a central cup shaped cylindrical drum 30, the outer end of which is closed by a wall 31 and the inner end being open. A boss 32, which projects into the interior of the drum from the center of the wall 31, is provided with a central bore which is rotatably mounted upon a stub shaft 33, said shaft having a reduced threaded end 34 engaged within a correspondingly threaded aperture provided in the lateral arm 13 of the bracket 12. A cup shaped cylindrical housing 35, having its outer end closed by a flat wall 36, is suitably secured, as by the rivets 37, to the wall 31 of the drum 30 so as to form with said drum a unitary assembly; and the drum and housing are retained upon the stub shaft 32 by means of the nut 38.

The inner end of the drum 30 is provided with a plurality of notches 39 for a purpose to be presently described, and a plurality of channel shaped guides 40 are secured about the outer periphery of the drum in parallelism with each other and with the longitudinal axis of said drum. A plurality of channelled guides 41 similar to the guides 40 are secured about the inner circumference of the housing 35, each of the guides 41 being arranged in parallelism with and aligned radially of the housing with a co-operating guide 40. The central web of each guide 40 is cut out adjacent to its respective notch 39 so as to permit the lug 42, projecting laterally from the frame of each slide S, to project inwardly and radially towards the axis of each drum. Each lug 42 is slotted as at 43 to provide a means with which the slide changing mechanism is adapted to engage.

The slide changing mechanism.

The end of the armature shaft 27 of the motor 26 opposite to the fan carrying end projects into a bore 44 provided in the gear housing 11 and for convenience in assembling the parts, the shaft 27 is connected by means of a coupling 45 with a worm shaft 46 having a collar or shoulder 47 thereon. A worm 48 is keyed to the worm shaft 46 and a stop pin 49 screwed into the housing 11 has its inner end in contact with the end of said shaft, thereby serving as a means to properly locate the worm 48 with respect to the worm wheel 50 and also acting as a thrust bearing for the shaft 46.

Figures 3, 7:
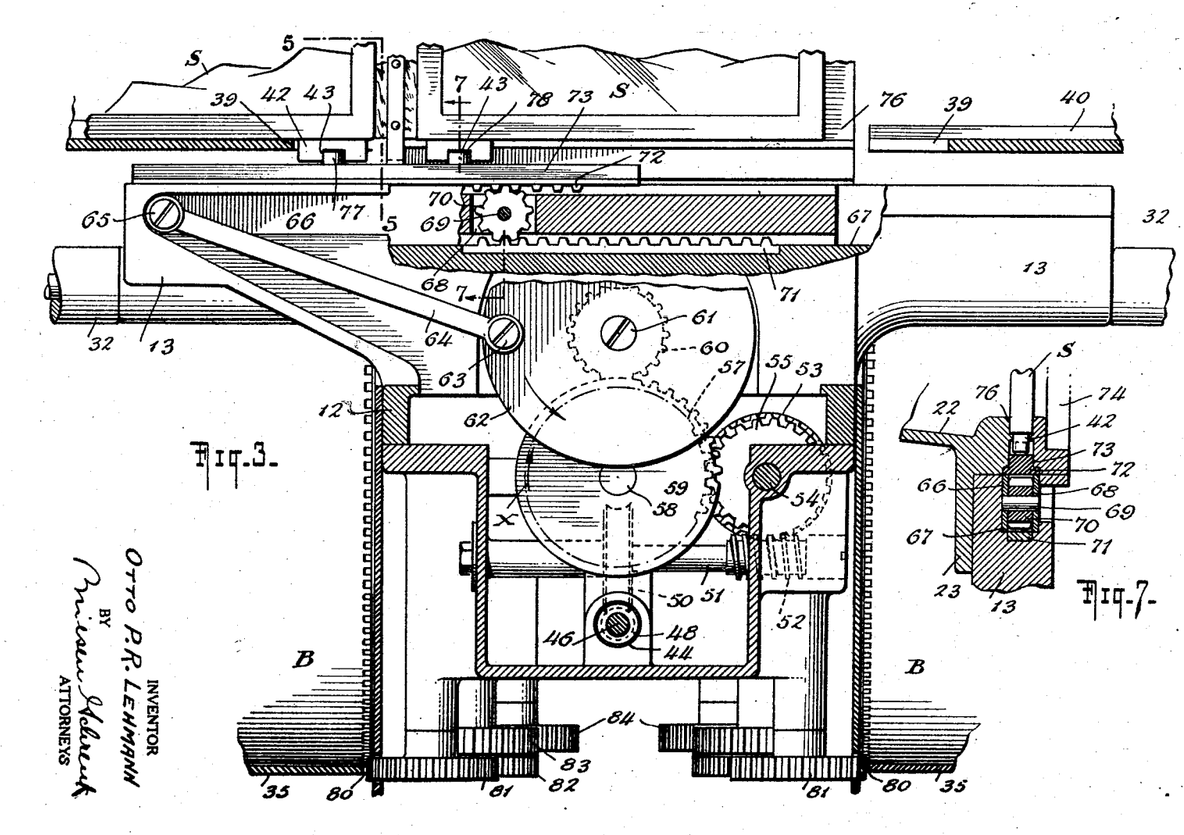
Fig. 3 is an enlarged vertical section, partly broken away on the line 3—3 of Fig. 1.
Fig. 7 is a vertical sectional detail on the line 7—7 of Fig. 3.
Figure 4:
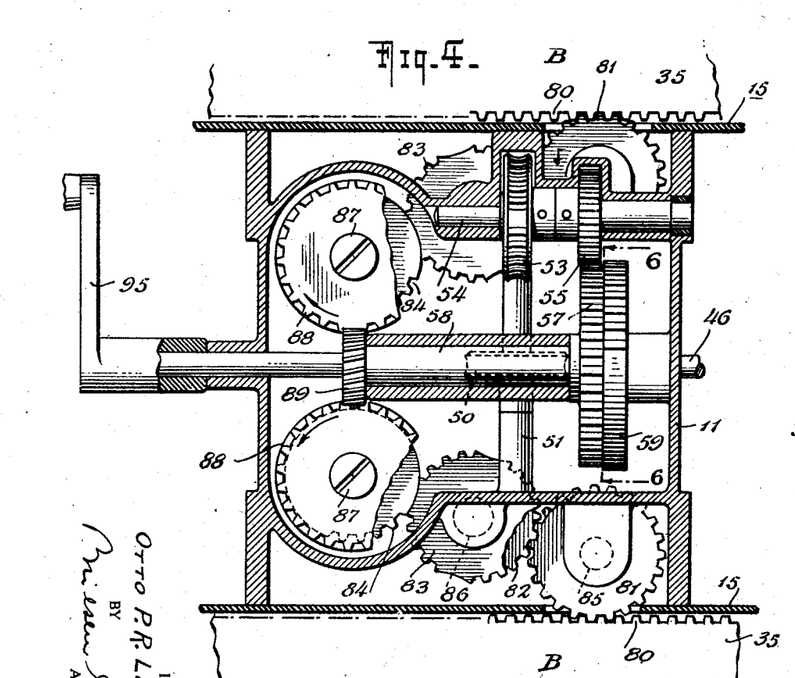
Fig. 4 is a horizontal section on the line 4—4 of Fig. 1.

The worm wheel 50 is secured to a transverse shaft 51, rotatably mounted in the housing 11, and carrying at its right hand end (Fig. 3) a worm 52, which meshes with a worm wheel 53, secured to a shaft 54 extending parallel to the worm and motor shafts 46 and 27. A spur gear 55 is suitably secured to the shaft 54 and meshes with spur gear 57, rotatably mounted on a shaft 58, which is mounted in suitable bearings in the housing 11 and located just above and parallel with the worm shaft 46. An intermittent gear 59 secured to the shaft 58 is driven by the gear 57, by mechanism to be hereinafter described, and meshes with and drives a second intermittent gear 60 carried by a shaft 61 mounted in the bracket 12 above shaft 58. A crank disc 62 mounted on said shaft 61 adjacent to the gear 60, is provided with a crank pin 63 which is connected by means of a connecting rod 64 with a pin 65, extending laterally from the side of a slide 66, which slide is mounted in a suitable guide way 67, (see Fig. 7) extending longitudinally of the bracket 12 and the arms 13 thereof. The slide 66 is provided between its ends with a vertically extending slot 68 in which is rotatably mounted, as by means of the pin 69, a pinion 70, which pinion meshes with a fixed rack 71, secured to the bracket 12 within the guide way 67, and which also meshes with a movable rack 72. The movable rack 72 is slidably mounted within a suitable guide way 73 formed between the inner end of the lower wall of the collector tube 22 and a rectangular frame 74 secured to said tube. The inner faces of the top and bottom members of said frame also form with the top and bottom inner faces of the tube, a pair of guide ways 75, 76 in which the slides S are moved to and from the exposure positions and by which they are supported during the projection of the views thereon. The upper face of the movable rack 72 has a pair of lugs 77, 78, projecting upwardly therefrom, which lugs are adapted to be engaged within the slots 43 formed in the lugs 42 of the slides S.

Magazine driving means.

The inner face of the cylindrical wall of each of the reel housings 35 is provided with gear teeth 80 with which a gear 81 meshes, said gear being driven by a gear 82 secured to an intermittent gear 83, meshing with a cooperating intermittent gear 84; the gears 81, 82 and 83 and 84 respectively, being rotatably mounted upon the vertically extending shafts 85, 86 and 87 mounted in suitable bearings provided in the gear housing 11. The intermittent gear 84 is secured to a gear wheel 88 provided with 45° teeth, which mesh with and are driven by the similarly inclined teeth of a gear 89 which is mounted upon the shaft 58.

The manual reel driving device.

Figure 1:
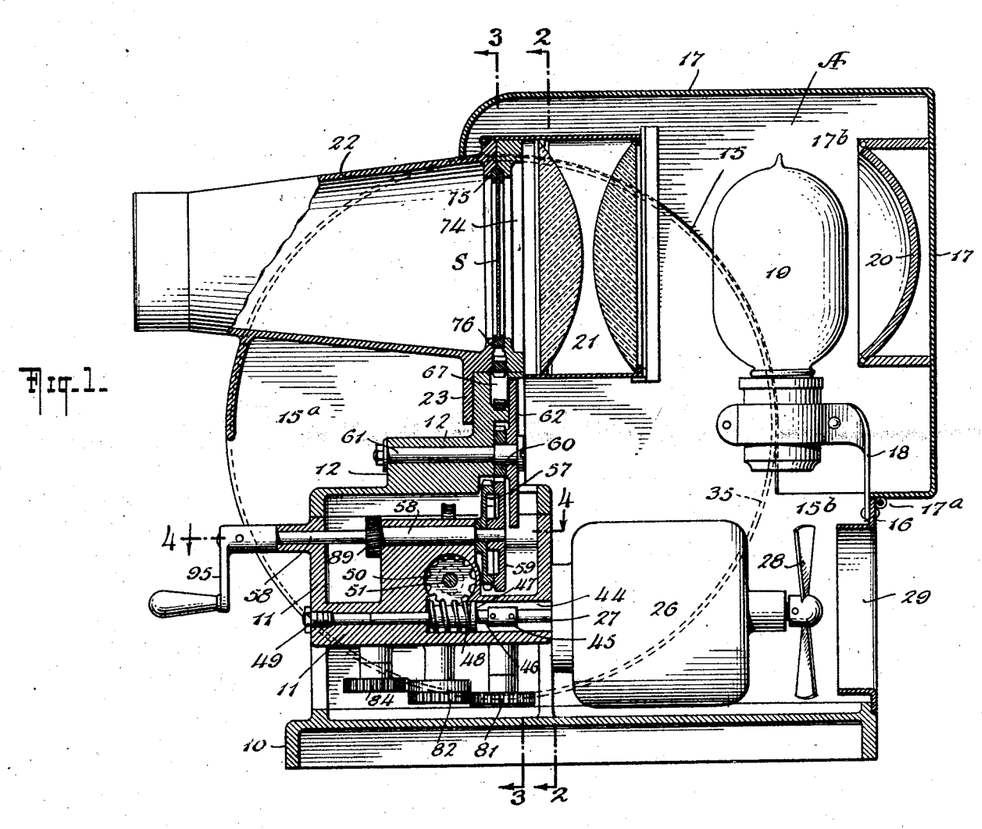
Fig. 1 is a central longitudinal vertical section taken on the line 1—1 of Fig. 2.
Figures 5, 6:
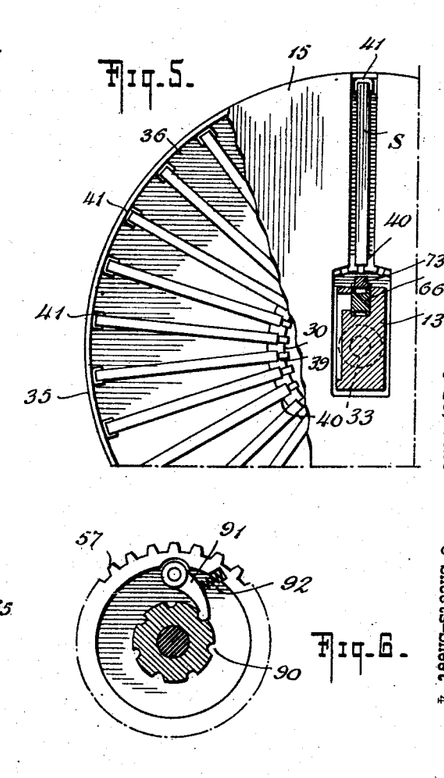
Fig. 5 is a vertical sectional detail on the line 5—5 of Fig. 3.
Fig. 6 is a vertical sectional detail on the line 6—6 of Fig. 4.

As it is sometimes desirable to operate the machine manually independently of the motor drive I accomplish this purpose by the mechanism shown in Figs. 1 and 6 of the drawing. It will be remembered that the gear 57 is rotatably mounted upon the shaft 58 while the intermittent gear 59 is secured to said shaft. The opposed faces of the gears 57 and 59 as clearly shown in Fig. 1 of the drawing are recessed and the hub of gear 59 is provided with a plurality of notches or ratchet teeth 90 with which the end of a pawl 91 carried by the gear 57 is adapted to be engaged; a spring 92 being provided to hold said pawl 91 in engagement with the teeth 90. When the gear 57 is rotated in the direction indicated by the arrow X in Fig. 3, and which direction corresponds to the rotation of said gear by the motor 26, the pawl 91 will engage the ratchet teeth 92 and thereby rotate the gear 59. If, however, it is desired to operate the machine manually, the handle 95 secured to the outer end of the shaft 58 is rotated in the direction of the arrow, but as the gear 57 is not secured to the shaft the gear 59 will be rotated and as the rotation of the shaft will be in a direction which permits the pawl 91 to slip, the rotation of shaft 58 and gear 59 will not cause the gear 57 to be rotated.

Operation.

Figure 2:
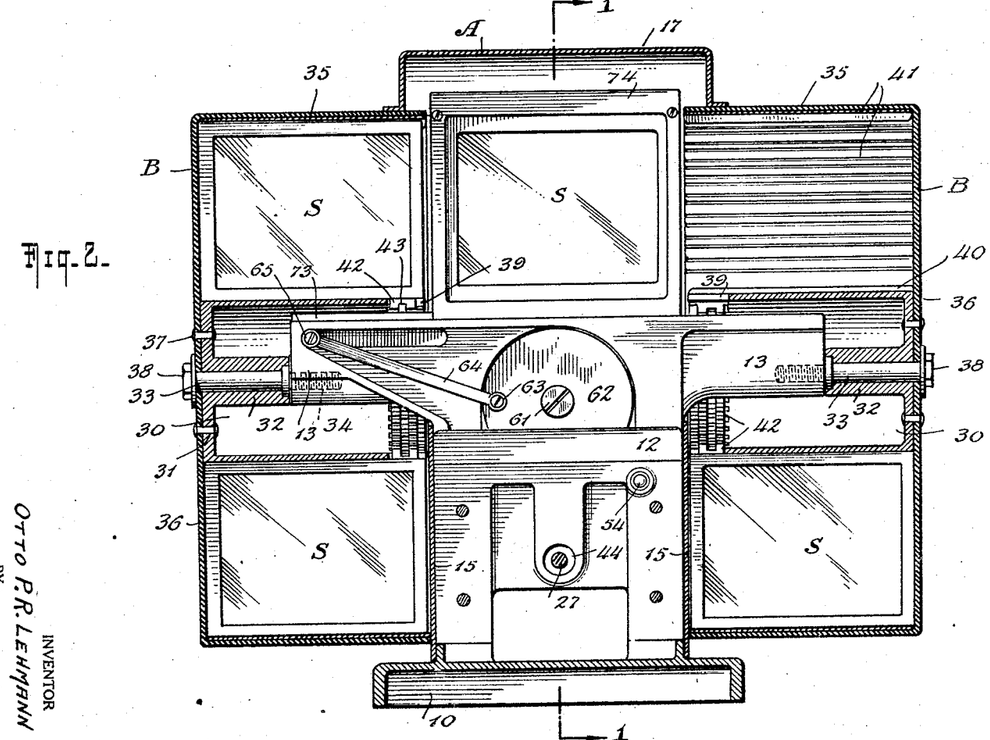
Fig. 2 is a vertical section on the line 2—2 of Fig. 1.

The operation of the machine is as follows, the rotation of the motor 26 being communicated by worm 48, worm wheel 50, shaft 51, worm wheel 53, shaft 54, spur gears 55, 57, shaft 58 and intermittent gears 59 and 60 will cause the crank disc 62 to be intermittently rotated, thus reciprocating the slide 66. The extent of movement of the slide 66 is doubled by the arrangement of the fixed and movable racks 71, 72 and the pinion 70. The rotation of the shaft 58 and with it the gear 88 produced by the motor will also rotate each of the gear trains consisting of the gears 88, 84, 83, and 81 thereby driving the housings 35 which contain the slides S. The intermittent gears 59 and 60 and 83 and 84 are so constructed and arranged that the housings 35 will be in motion when the slide 66 is stationary and vice versa. Assuming that the parts are in the position shown in Fig. 2 and that the slide 66 has justed started to move towards the right, it will be seen that the engagement of the lugs 77, 78, carried by the movable rack, with the slots 43 of the lugs 44 of the slide S shown within the tube 22 and the slide S′ in the left hand magazine, will cause the slide S to be moved from the tube 22 out of the guide ways 75, 76 and into the guideways 40, 41 of the reel B at the right hand side of the machine, while the slide S′ in the left hand magazine is simultaneously moved into the guide ways 75, 76. When the slide 66 reaches its right hand limit of movement the intermittent gears 59, 60 have reached their dwell spaces, therefore the slide remains stationary, during which stationary period the picture or other subject matter contained on the slide is projected. During the period the slide 66 is stationary, the toothed portions intermittent gears 83, 84 for the right hand magazine are in mesh thus causing the right hand housing 35 and associated parts to be rotated a portion of a revolution equal to the space between two adjacent sets of guides 40, 41, thus moving the slide S out of engagement with the lug 78 and bringing a fresh slide into engagement with said lug. When this movement is completed the intermittent gears 59, 60, have again become active and the slide 66 is then moved to the left, causing the slide S′ to be returned to its magazine and withdrawing the fresh slide from the right hand magazine to be exhibited during the period the left hand magazine is rotating to remove the slide S′ from engagement with the lug 77 and to bring another slide into engagement therewith.

The slides S and the frames carrying them may be removed frome the machine by taking out the lenses 21 and the rectangular frame 74, whereby access may be obtained to the guideways 75 and 76 and the slides removed from the machine. The individual slides are brought to the removable position by operating the manually controlled handle 95 and slides may be fed into the machine by the same means.

Figures 8, 9, 10:
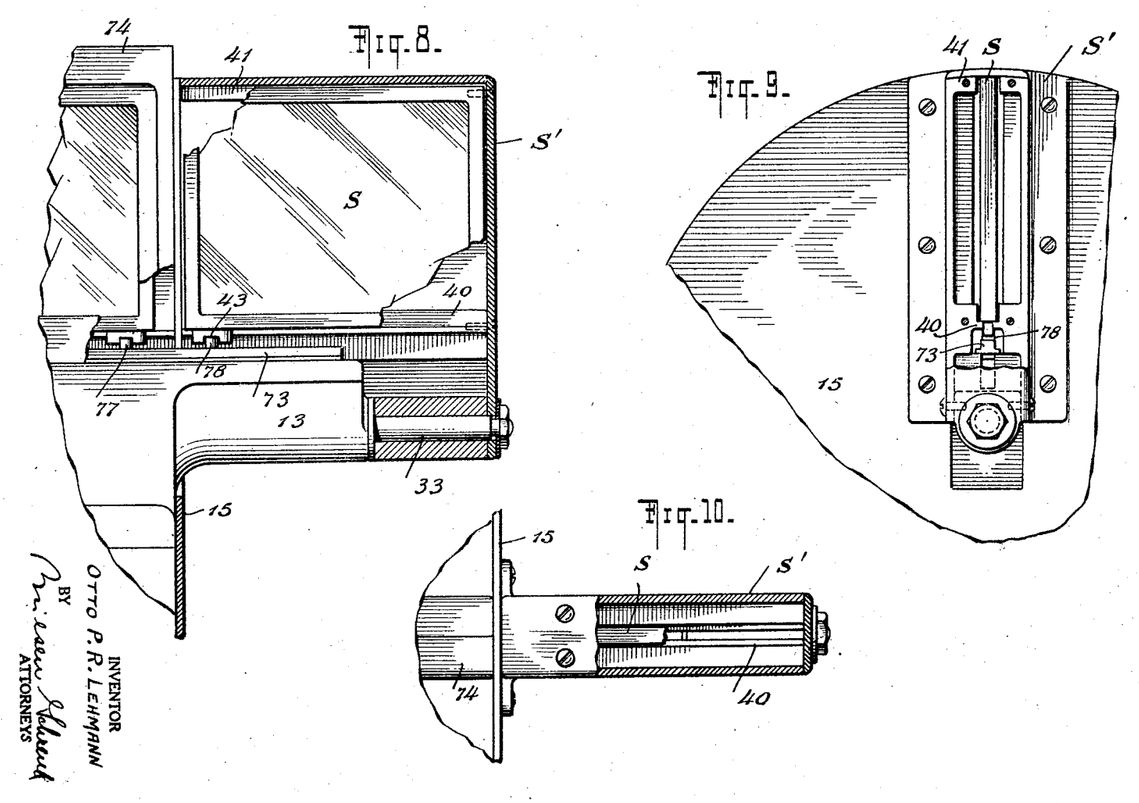

In some instances it is desirable to repeat a slide between each successive varying slide and for this purpose a special slide holder S¹ is provided for the machine, which is shown in Figs. 8, 9 and 10. This special slide holder is adapted to hold but a single slide of the same construction as the slides heretofore described in this specification and comprising a metal frame which carries the glass slide and on which is secured the lug 42.

The single slide holder is attached to one of the stub shafts 33 (as illustrated in Fig. 8) where it remains in a fixed and non-rotatable position and each time a slide is carried back into the housing 35 the slide changing mechanism by engagement of the lug 78 with the slot 43 will carry the single special slide to the exhibiting station, where it is projected. When the slide mechanism carries a succeeding slide from the housing 35 the slide changing mechanism withdraws the special slide from the exhibiting station and returns it into the special slide holder, which alternate operation of exhibiting and removing the special slide is repeated between the exhibition of each succeeding slide from the housing 35. It is to be understood that when this special single slide holder is applied to one of the machines the driving mechanism for the cylindrical housing which it replaces is eliminated, inasmuch as the special housing remains stationary.

It is obvious that the mechanism described can be readily utilized with stereopticon machines and other devices in which it is desirous of exhibiting slides, pictures or advertisements.

It will be understood that variations, changes and modifications of the form of the invention hereinbefore described and illustrated in the drawing may be resorted to without departing from the spirit of my invention.

I claim:

1. In a machine of the character described, a framework, a projection apparatus mounted on said framework, an exposure position in the path of said projecting apparatus, a pair of rotatable slide carrying magazines mounted on said framework, said magazines being arranged on opposite sides of the exposure position and to rotate about horizontal axes located in axial alignment, intermittently actuated means to move a slide substantially horizontally and parallel to said axes and alternately from each of said magazines to said exposure position and to return said slide to its respective magazine and means to intermittently rotate each of said magazines in alternation.

2. In a machine of the character described, a framework, a projection apparatus mounted on said framework, an exposure position in the path of said projecting apparatus, a pair of rotatable slide carrying magazines mounted on said framework, said magazines being arranged on opposite sides of the exposure position and to rotate about horizontal axes located in axial alignment, each of said magazines being provided with plurality of parallel guide ways in which a plurality of slides are adapted to be inserted, intermittently actuated means to move a slide alternately, substantially parallel to said axes, from each of said magazines to said exposure position and to return said slide to its respective magazine and means to intermittently rotate each of said magazines in alternation.

3. In a machine of the character described, a framework, a projection apparatus mounted on said framework, an exposure position in the path of said projecting apparatus, a pair of rotatable slide carrying magazines mounted on said framework, said magazines being arranged on opposite sides of the exposure position and to rotate about horizontal axes located in axial alignment, each of said magazines being provided with a plurality of pairs of guide ways, the members of each pair being arranged in parallel alignment with each other and in parallelism with the remaining guide ways, intermittently actuated means to move a slide alternately, substantially parallel to said axes, from each of said magazines to said exposure position and to return said slide to its respective magazine and means to intermittently rotate each of said magazines in alternation.

4. In a machine of the character described, a framework, a projection apparatus mounted on said framework, an exposure position in the path of said projecting apparatus, a pair of rotatable slide carrying magazines mounted on said framework, said magazines being arranged on opposite sides of the exposure position and to rotate about horizontal axes located in axial alignment, each of said magazines comprising a central cylindrical drum, a cylindrical housing secured to said drum and rotatable therewith, a plurality of guide ways secured to the outer circumference of said drum and a plurality of guide ways secured to the inner circumference of said housing, said outer and inner guide ways being arranged in cooperating parallel pairs, the members of each pair being in alignment radially of said housing, intermittently acuated means to move a slide alternately, substantially parallel to said axes, from each of said magazines to said exposure position and to return said slide to its respective magazine and means to intermittently rotate each of said magazines in alternation.

5. In a machine of the character described, a framework, a projection apparatus mounted on said framework, an exposure position in the path of said projecting apparatus, a pair of rotatable slide carrying magazines mounted on said framework, said magazines being arranged on opposite sides of the exposure position and to rotate about horizontal axes located in axial alignment, each of said magazines being provided with a plurality of parallel guide ways in which a plurality of slides are adapted to be inserted, said projection apparatus being provided with a guide way with which said first named guide ways are adapted to be brought into parallel alignment, slide engaging means carried by said framework to engage a slide within said first named guide ways and move it substantially parallel to said axes into said second named guide way and means for driving said slide engaging means.

6. In a machine of the character described, a framework, a projection apparatus mounted on said framework, a pair of rotatable slides carrying magazines mounted on said framework one on each side of said projection apparatus, each of said magazines being provided with a plurality of parallel guide ways in which a plurality of slides are adapted to be inserted, said projection apparatus being provided with a guide way with which said first named guide ways are adapted to be brought into parallel alignment, slide engaging means carried by said framework to engage a slide within said first named guide ways and move it into said second named guide way and means for driving said slide engaging means, including a fixed rack, a reciprocating rack, a reciprocating slide carrying a rotatable pinion interposed between and meshing with said fixed and reciprocating racks, and means to intermittently reciprocate said slide.

7. In a machine of the character described, a framework, a projection apparatus mounted on said framework, a pair of rotatable slides carrying magazines mounted on said framework one on each side of said projection apparatus, each of said magazines being provided with a plurality of parallel guide ways in which a plurality of slides are adapted to be inserted, said projection apparatus being provided with a guide way with which said first named guide ways are adapted to be brought into parallel alignment, slide engaging means carried by said framework to engage a slide within said first named guide ways and move it into said second named guide way and means for driving said slide engaging means, including a fixed rack, a reciprocating rack, a reciprocating slide carrying a rotatable pinion interposed between and meshing with said fixed and reciprocating racks, means to intermittently reciprocate said slide, and means to intermittently rotate said magazines in alternation.

8. In a machine of the character described, a framework, a projection apparatus mounted on said framework, an exposure position in the path of said projecting apparatus, a pair of rotatable slide carrying magazines mounted on said framework, said magazines being arranged on opposite sides of the exposure position and to rotate about horizontal axes located in axial alignment, intermittently actuated means to move a slide alternately and substantially parallel to said axes, from each of said magazines to said exposure position and to return said slide to its respective magazine and means to intermittently rotate each of said magazines in alternation, a motor and connections therefrom to each of said intermittent means to cause said means to operate continuously and automatically.

9. In a machine of the character described, a framework, a projection apparatus mounted on said framework, an exposure position in the path of said projecting apparatus, a pair of rotatable slide carrying magazines mounted on said framework, said magazines being arranged on opposite sides of the exposure position and to rotate about horizontal axes located in axial alignment, intermittently actuated means to move a slide alternately and substantially parallel to said axes, from each of said magazines to said exposure position and to return said slide to its respective magazine and means to intermittently rotate each of said magazines in alternation, a motor and connections therefrom to each of said intermittent means to cause said means to operate continuously and automatically and means to operate said magazine manually, independently of the motor, said means comprising in part coacting gears, one of said gears having connection with said handle and adapted to be rotated thereby and during its manual rotation leaving said companion gear stationary, said companion gear during the automatic operation of the magazine rotating with said first mentioned gear.

10. In a machine of the character described, a framework, a projecting apparatus mounted on said framework, an exposure position in the path of said projecting apparatus, a rotatable slide carrying magazine adapted to carry a plurality of slides mounted on a horizontal axis on said framework and adjacent to said exposure position, a motor, driving means actuated by said motor to rotate said magazine, reciprocating slide engaging means to move a slide, substantially parallel to the axis of said magazine, from said magazine to said exposure position, said driving means and slide engaging means each being connected with said motor by a gear train including a pair of intermittent gears.

11. In a machine of the character described, a framework, a projection apparatus mounted on said framework, an exposure position in the path of said projecting apparatus, a rotatable slide carrying a magazine adapted to contain a plurality of slides mounted on a horizontal axis on said framework and adjacent to said exposure position, a motor, driving means actuated by said motor to rotate said magazine, reciprocating slide engaging means to move a slide, substantially parallel to the axis of said magazine, from said magazine to said exposure position, and said driving means and slide engaging means each being connected with said motor by a gear train including a pair of intermittent gears, each of said pair of intermittent gears being constructed and arranged to be operative when the other pair is inoperative.

12. In a machine of the character described, a framework, a projection apparatus mounted on said framework, a pair of rotatable slide carrying magazines adapted to contain a plurality of slides mounted on said framework one on each side of said projection apparatus, slide engaging means to move the slides successively and in alternation from each of said magazines, a motor, and a plurality of gear trains one for each of said magazines and said slide engaging means driven by said motor, each of said gear trains including a pair of intermittent gears, said intermittent gears being constructed and arranged to hold both of said magazines stationary during the movement of said slide engaging means and to rotate alternately one of said magazines while holding the other stationary when said slide engaging means is at rest.

13. In a projecting machine, in combination, a projecting apparatus, a horizontally arranged exposure position in alignment with said projecting apparatus, rotatable magazines mounted at each side of said exposure position upon horizontal axes, a plurality of slides in each of said magazines and adapted to be withdrawn therefrom endwise, said slides being independently supported in said magazines upon guide ways, guide ways in said exposure position, the guide ways in the magazines being adapted, successively and alternately in each magazine, to align with the guide ways of said exposure position, slide transferring mechanism, reciprocating in a plane parallel to the said axes, adapted to remove a slide from one of said magazines to said exposure position and to return a slide to the other magazine.

In testimony whereof I have hereunto set my hand.

OTTO P. R. LEHMANN.